(12) United States Patent
Chakraborty et al.

(10) Patent No.: US 11,566,310 B2
(45) Date of Patent: Jan. 31, 2023

(54) METHOD FOR THE MANUFACTURING OF LIQUID METAL EMBRITTLEMENT RESISTANT ZINC COATED STEEL SHEET

(71) Applicant: ARCELORMITTAL, Luxembourg (LU)

(72) Inventors: Anirban Chakraborty, Chesterton, IN (US); Hassan Ghassemi-Armaki, Schererville, IN (US); Pascal Bertho, Maizieres-les-Metz (FR); Christian Allely, Metz (FR)

(73) Assignee: ArcelorMittal, Luxembourg (LU)

( * ) Notice: Subject to any disclaimer, the term of this patent is extended or adjusted under 35 U.S.C. 154(b) by 90 days.

(21) Appl. No.: 16/759,253

(22) PCT Filed: Nov. 15, 2018

(86) PCT No.: PCT/IB2018/058991
§ 371 (c)(1),
(2) Date: Apr. 24, 2020

(87) PCT Pub. No.: WO2019/097440
PCT Pub. Date: May 23, 2019

(65) Prior Publication Data
US 2020/0263284 A1 Aug. 20, 2020

(30) Foreign Application Priority Data

Nov. 17, 2017 (WO) .................. PCT/IB2017/057196

(51) Int. Cl.
C22C 38/58 (2006.01)
C21D 1/76 (2006.01)
(Continued)

(52) U.S. Cl.
CPC ................ *C22C 38/58* (2013.01); *C21D 1/76* (2013.01); *C21D 9/46* (2013.01); *C21D 9/561* (2013.01);
(Continued)

(58) Field of Classification Search
None
See application file for complete search history.

(56) References Cited

U.S. PATENT DOCUMENTS 4,569,731 A  2/1986  Matsuda et al.
5,234,721 A  8/1993  Rostoker et al.
(Continued)

FOREIGN PATENT DOCUMENTS

EP   1199376 A1   4/2002
EP   2143816 A1   1/2010
(Continued)

OTHER PUBLICATIONS

Effect of dew point on the surface selective oxidation and subsurface microstructure of TRIP-aided steel Huachu Liu Surface & Coatings Technology 206 (2011) 1237-1243 (Year: 2011).*
(Continued)

*Primary Examiner* — Jenny R Wu
(74) *Attorney, Agent, or Firm* — Davidson, Davidson & Kappel, LLC

(57) ABSTRACT

The present invention relates to a method for the manufacture of a coated steel sheet comprising the following successive steps: A. the coating of the steel sheet with a first coating consisting of nickel and having a thickness between 600 nm and 1400 nm, the steel sheet having the following composition in weight: 0.10<C<0.40%, 1.5<Mn<3.0%, 0.7<Si<3.0%, 0.05<Al<1.0%, 0.75<(Si+Al)<3.0%, and on a purely optional basis, one or more elements such as Nb≤0.5%, B≤0.010%, Cr≤1.0%, Mo≤0.50%, Ni≤1.0%,
(Continued)

Ti≤0.5%, the remainder of the composition making up of iron and inevitable impurities resulting from the elaboration, B. the recrystallization annealing at a temperature between 820 to 1200° C., C. the coating with a second coating based on zinc not comprising nickel.

10 Claims, 1 Drawing Sheet

(51) Int. Cl.
| | |
|---|---|
| *C21D 9/46* | (2006.01) |
| *C21D 9/56* | (2006.01) |
| *C22C 38/02* | (2006.01) |
| *C22C 38/06* | (2006.01) |
| *C22C 38/44* | (2006.01) |
| *C22C 38/48* | (2006.01) |
| *C22C 38/50* | (2006.01) |
| *C22C 38/54* | (2006.01) |
| *C23C 2/06* | (2006.01) |
| *B23K 103/04* | (2006.01) |
| *B23K 11/11* | (2006.01) |
| *B23K 35/02* | (2006.01) |
| *B23K 35/28* | (2006.01) |
| *B23K 35/30* | (2006.01) |

(52) U.S. Cl.
CPC .............. *C22C 38/02* (2013.01); *C22C 38/06* (2013.01); *C22C 38/44* (2013.01); *C22C 38/48* (2013.01); *C22C 38/50* (2013.01); *C22C 38/54* (2013.01); *C23C 2/06* (2013.01); *B23K 11/11* (2013.01); *B23K 35/0255* (2013.01); *B23K 35/286* (2013.01); *B23K 35/3073* (2013.01); *B23K 2103/04* (2018.08)

(56) References Cited

U.S. PATENT DOCUMENTS

| | | | |
|---|---|---|---|
| 5,441,628 | A | 8/1995 | Tasaki et al. |
| 2012/0009437 | A1 | 1/2012 | Tran et al. |
| 2012/0100391 | A1 | 4/2012 | Lee et al. |
| 2012/0267012 | A1 | 10/2012 | Sohn et al. |
| 2014/0241933 | A1 | 8/2014 | Haga et al. |
| 2014/0349133 | A1 | 11/2014 | Lee et al. |
| 2014/0370330 | A1 | 12/2014 | Sato et al. |
| 2015/0017471 | A1 | 1/2015 | Shuto et al. |
| 2015/0284819 | A1 | 10/2015 | Tamaki et al. |
| 2016/0075109 | A1 | 3/2016 | Oka et al. |
| 2016/0082701 | A1 | 3/2016 | Kurosaki |
| 2016/0145704 | A1 | 5/2016 | Kawasaki et al. |
| 2016/0208355 | A1 | 7/2016 | Nakagaito et al. |
| 2017/0073792 | A1 | 3/2017 | Hikida et al. |
| 2018/0371566 | A1 | 12/2018 | Gospodinova et al. |
| 2020/0123674 | A1 | 1/2020 | Allely et al. |
| 2020/0263284 | A1 | 8/2020 | Chakraborty et al. |

FOREIGN PATENT DOCUMENTS

| | | | |
|---|---|---|---|
| EP | 2631319 | A1 | 8/2013 |
| EP | 3088557 | A | 11/2016 |
| JP | S589965 | | 1/1983 |
| JP | H0328358 | A | 2/1991 |
| JP | 2 561331 | B2 | 12/1996 |
| JP | 2561331 | | 12/1996 |
| JP | 2561331 | B2 * | 12/1996 |
| JP | 2002-241896 | A | 8/2002 |
| JP | 2004124187 | A | 4/2004 |
| JP | 2008144264 | | 6/2008 |
| JP | 2008144264 | A | 6/2008 |
| JP | 2008144264 | A * | 6/2008 |
| JP | 2011-001610 | A | 1/2011 |
| JP | 2013-541645 | A | 11/2013 |
| JP | 2014221943 | A | 11/2014 |
| JP | 2016089274 | A | 5/2016 |
| KR | 20120041540 | | 5/2012 |
| KR | 20120074144 | A | 7/2012 |
| KR | 20120074145 | | 7/2012 |
| RU | 2418094 | C2 | 5/2011 |
| RU | 2620842 | C1 | 5/2017 |
| WO | 2014124749 | A1 | 8/2014 |
| WO | WO2017108897 | A1 | 6/2017 |
| WO | WO2018203097 | A1 | 11/2018 |
| WO | 2019082035 | A1 | 5/2019 |
| WO | 2019082036 | A1 | 5/2019 |
| WO | 2019082037 | A1 | 5/2019 |
| WO | 2019082038 | A1 | 5/2019 |
| WO | 2019097440 | A1 | 5/2019 |

OTHER PUBLICATIONS

See International Search Report of PCT/IB2018/058158, dated Feb. 14, 2019.
See International Search Report of PCT/IB2018/058155, dated Dec. 21, 2018.
See International Search Report of PCT/IB2018/058154, dated Dec. 3, 2018.
U.S. Appl. No. 16/753,739, filed Apr. 3, 2020, which is national phase application of PCT/IB2018/058154, published as WO2019/082035 A1 on May 2, 2019.
U.S. Appl. No. 16/754,011, filed Apr. 6, 2020, which is national phase application of PCT/IB2018/058155, published as WO2019/082036 A1 on May 2, 2019.
U.S. Appl. No. 16/754,538, filed Apr. 8, 2020, which is national phase application of PCT/IB2018/058157, published as WO2019/082037 A1 on May 2, 2019.
U.S. Appl. No. 16/759,253, filed Apr. 24, 2020, which is national phase application of PCT/IB2018/058991, published as WO2019/097440 A1 on May 23, 2019.
U.S. Appl. No. 16/754,589, filed Apr. 8, 2020, which is national phase application of PCT/IB2018/058158, published as WO2019/082038A1 on May 2, 2019.
International Search Report of PCT/IB2018/058991, dated Feb. 15, 2019.

* cited by examiner

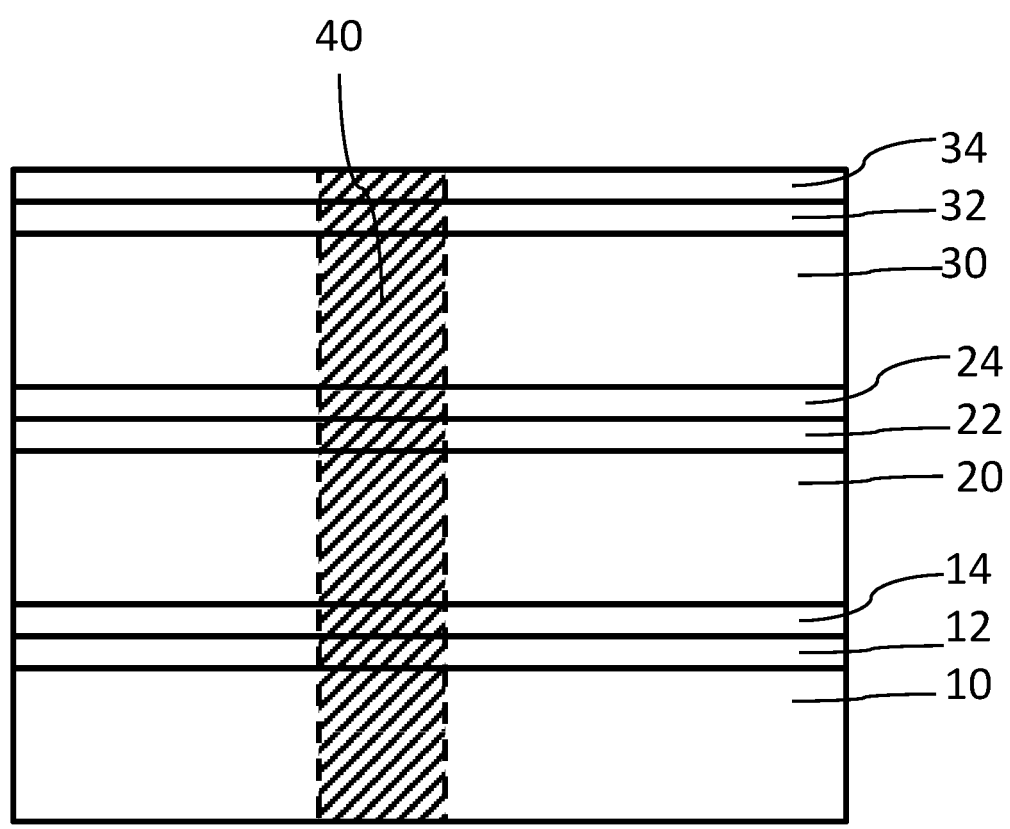

METHOD FOR THE MANUFACTURING OF LIQUID METAL EMBRITTLEMENT RESISTANT ZINC COATED STEEL SHEET

The present invention relates to a method for the manufacture of a zinc based coated steel sheet. The invention is particularly well suited for the manufacture of automotive vehicles.

BACKGROUND

Zinc based coatings are generally used because they allow for protection against corrosion, thanks to barrier as well as cathodic protection. The barrier effect is obtained by the application of the metallic coating on steel surface. Thus, the metallic coating prevents the contact between steel and corrosive atmosphere. The barrier effect is independent from the nature of the coating and the substrate. On the contrary, sacrificial cathodic protection is based on the fact that zinc is a metal less noble than steel. Thus, if corrosion occurs, zinc is consumed preferentially as compared to steel. Cathodic protection is essential in areas where steel is directly exposed to corrosive atmosphere, like cut edges where surrounding zinc will be consumed before steel.

However, when heating steps are performed on such zinc coated steel sheets, for example hot press hardening, welding, cracks are observed in steel which propagate from the steel/coating interface. Indeed, occasionally, there is a reduction of metal mechanical properties such as ductility due to the presence of cracks in coated steel sheet after above operation. These cracks appear due to following conditions: high temperature; contact with a liquid metal having a low melting point (such as zinc) in addition to the presence of tensile stress; heterogeneous diffusion of molten metal in substrate grain and grain boundaries. The designation for such phenomenon is known as liquid metal embrittlement (LME), also called liquid metal assisted cracking (LMAC).

The patent application JPS589965 discloses a surface-treated steel sheet obtained by subjecting both surfaces of a steel sheet to electroplating with any one of Ni, Cr, Zn, Zn—Ni alloy or Sn—Ni alloy, and heating in a non-oxidizing atmosphere to form a diffusion layer of the plating metal in the substrate steel, and subjecting one surface of the resulting plated steel sheet to hot-dip galvanizing process to form a galvanized layer. It is cited that the coating weight of galvanized layer may be reduced, which is extremely advantageous from the viewpoint of weldability and economic efficiency.

Indeed, above patent application shows the surface-treated steel sheet has an improved weldability only due to the decrease of the zinc coating weight. Moreover, there is no mention of LME resistance improvement, especially for high strength steels having alloying elements including Mn, Al and Si.

SUMMARY OF THE INVENTION

It is an object of the present invention to provide a coated steel sheet which shows a high LME resistance behavior. It aims to make available, in particular, an industrially easily implementable method in order to obtain an assembly which improves LME resistance especially after the hot press forming and/or the welding.

The present invention provides a method for the manufacture of a coated steel sheet comprising the following successive steps:

A. the coating of the steel sheet with a first coating consisting of nickel and having a thickness between 600 nm and 1400 nm, the steel sheet having the following composition in weight:
0.10<C<0.40%,
1.5<Mn<3.0%,
0.7<Si<3.0%,
0.05<Al<1.0%,
0.75<(Si+Al)<3.0%,
and on a purely optional basis, one or more elements such as
Nb≤0.5%,
B≤0.010%,
Cr≤1.0%,
Mo≤0.50%,
Ni≤1.0%,
Ti≤0.5%,
the remainder of the composition making up of iron and inevitable impurities resulting from the elaboration,
B. the recrystallization annealing of said coated steel sheet at a temperature between 820 to 1200° C.,
C. the coating of the steel sheet obtained in step B) with a second coating based on zinc not comprising nickel.

A coated steel sheet, a spot welded joint and the use of a steel sheet are also provided.

Other characteristics and advantages of the invention will become apparent from the following detailed description of the invention.

The designation "steel" or "steel sheet" means a steel sheet, a coil, a plate having a composition allowing the part to achieve a tensile strength up to 2500 MPa and more preferably up to 2000 MPa. For example, the tensile strength is above or equal to 500 MPa, preferably above or equal to 980 MPa, advantageously above or equal to 1180 MPa and even above or equal 1470 MPa.

BRIEF DESCRIPTION OF THE DRAWING

FIG. 1 shows schematically a non-limiting example of a spot welded joint with three coated steel sheets made according to the present invention.

DETAILED DESCRIPTION

The invention relates to method for the manufacturing of a coated steel sheet comprising the following successive steps:

A. the coating of the steel sheet with a first coating consisting of nickel and having a thickness between 600 nm and 1400 nm, the steel sheet having the following composition in weight percent
0.10<C<0.40%,
1.5<Mn<3.0%,
0.7<Si<3.0%,
0.05<Al<1.0%,
0.75<(Si+Al)<3.0%,
and on a purely optional basis, one or more elements such as
Nb≤0.5%,
B≤0.010%,
Cr≤1.0%,
Mo≤0.50%,
Ni≤1.0%,
Ti≤0.5%,
the remainder of the composition making up of iron and inevitable impurities resulting from the elaboration, B. the recrystallization annealing of said coated steel sheet at a temperature between 820 to 1200° C., C. the coating of the steel sheet obtained in step B) with a second coating based on zinc not comprising nickel.

Without willing to be bound by any theory, it seems that in order to obtain a steel sheet having the specific above composition with high resistance to LME, it is an essential feature to deposit the first coating of nickel on the sheet steel before the recrystallization annealing. During recrystallization annealing Ni diffuses towards the substrate steel sheet allowing formation of a Fe—Ni alloy layer. Indeed, Ni rich layer concentrates in the surface and sub-surface area of the steel sheet and thus preventing liquid zinc penetration into the steel during any heating steps such as welding. Thus, by applying the above method according to the present invention, it is possible to obtain a barrier or buffer layer which prevents LME.

If the first coating consisting of nickel has a thickness below 600 nm, there is a possibility of significant decrease of LME resistance behavior of the specific above coated steel sheet. Indeed, it seems that there is not enough Ni present in the surface and sub-surface region of steel sheet which provides enough barrier against LME.

For above steel composition, if the first coating consisting of nickel having thickness above 1400 nm, then after recrystallization annealing the amount of iron in the Fe—Ni alloy layer which is formed in the sub-surface and surface area is very low and is insufficient to form inhibition during subsequent hot dip galvanizing process. Due to presence of higher amount of Ni, a considerable amount of Ni diffuses in the steel substrate during recrystallization annealing and on the other hand, due to absence of inhibition layer, Ni also diffuses in the galvanized coating. Due to presence of higher amount of Ni in the coating, LME resistance behavior reduces. Moreover, the galvanized coating quality is poor due to absence of inhibition layer along with presence of higher amount of Ni in the coating.

The first coating consists of Nickel, i.e. Ni amount is >99 wt. % and <1% is unavoidable impurities.

The first coating can be deposited by any deposition method known by the person skilled in the art. It can be deposited by vacuum deposition or electro-plating or roll coating method. Preferably, it is deposited by electro-plating method.

Preferably, in step A), the first coating has a thickness between 600 and 950 nm. Preferably, in step A), the first coating has a thickness between 600 and 750 nm or between 750 and 950 nm.

Preferably, in step B), the recrystallization annealing is a continuous annealing which comprises continuous pre-heating, heating, soaking and cooling step.

Advantageously, the recrystallization annealing is performed in an atmosphere comprising from 1 to 30% of $H_2$ at a dew point between −60 and +30° C. or a dew point below 60° C. For example, the atmosphere comprises from 1 to 10% of $H_2$ at a dew point between −60° C. and −30° C. In another embodiment, the recrystallization annealing is performed from 1 to 30% of $H_2$ at a dew point between −30 and +30° C. Preferably, the recrystallization annealing is performed from 1 to 30% of $H_2$ at a dew point between −10 and +10° C. Indeed, without willing to be bound by any theory, it is believed that this dew point further improves the coatability of the steel sheet according to the present invention without considerable decrease of any mechanical property.

Advantageously, in step C), the second layer comprises above 50%, more preferably above 75% of zinc and advantageously above 90% of zinc. The second layer can be deposited by any deposition method known by the man skilled in the art. It can be by hot-dip coating, by vacuum deposition or by electro-galvanizing.

For example, the coating based on zinc comprises from 0.01 to 8.0% Al, optionally 0.2-8.0% Mg, the remainder being Zn.

Preferably, the coating based on zinc is deposited by hot-dip galvanizing method. In this embodiment, the molten bath can also comprise unavoidable impurities and residuals elements from feeding ingots or from the passage of the steel sheet in the molten bath. For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0% by weight.

In a preferred embodiment, the second layer consists of zinc. When the coating is deposited by hot-dip galvanizing process, the percentage of Al is comprised between 0.15 and 0.40 wt. % in the bath. Moreover, the iron presents in the first coating after recrystallization annealing reacts with aluminum and forms the inhibition layer. Thus, it provides reactive wetting behavior during hot dip galvanizing.

With the method according to the present invention, a steel sheet coated with a diffused alloy layer comprising iron and nickel formed through diffusion of nickel into the steel, such layer being directly topped by a zinc based layer is obtained. It is believed that the diffused alloy layer acts like a barrier layer against LME.

Preferably, the steel sheet has a microstructure comprising from 1 to 50% of residual austenite, from 1 to 60% of martensite and optionally at least one element chosen from: bainite, ferrite, cementite and pearlite. In this case, the martensite can be tempered or untempered.

In a preferred embodiment, the steel sheet has a microstructure comprising from 5 to 45% of residual austenite.

Preferably, the steel sheet has a microstructure comprising from 1 to 60% and more preferably between 10 to 60% of tempered martensite.

Advantageously, the steel sheet has a microstructure comprising from 10 to 40% of bainite, such bainite comprising from 10 to 20% of lower bainite, from 0 to 15% of upper bainite and from 0 to 5% of carbide free bainite.

Preferably, the steel sheet has a microstructure comprising from 1 to 25% of ferrite.

Preferably, the steel sheet has a microstructure comprising from 1 to 15% untempered martensite.

Advantageously, the steel sheet has a decarburized layer having a depth maximum of 40 μm, preferably maximum of 30 μm and more preferably maximum of 20 μm on either side of the sub-surface area. The decarburization is defined in the norm ISO 3887:2017. Indeed, without willing to be bound by any theory, it is believed that the decarburized layer further improves the LME resistance without considerably decreasing the mechanical properties of the steel sheet.

Preferably, an internal oxides layer having a thickness below or equal to 5 μm is present in the steel sheet. Without willing to be bound by any theory, it is believed that this layer leads to a good coatability of the zinc coating since the continuous inhibition layer $Fe_2Al_5$ is formed which represents good reactive wetting.

After the manufacture of a steel sheet, in order to produce some parts of a vehicle, it is known to assembly by welding two or more metal sheets. Thus, a spot welded joint is formed during the welding of at least two metal sheets, said spot being the link between the at least two metal sheets.

To produce a spot welded joint according to the invention, the welding is performed with an effective welding current between 3 kA and 15 kA and the force applied on the electrodes is between 150 and 850 daN with said electrode active face diameter being between 4 and 10 mm.

Thus, a spot-welded joint of at least two metal sheets comprising at least a steel sheet, comprising the coated steel sheet according to the present invention, is obtained. The above said joint contains less than 2 cracks having a size above 100 μm and wherein the longest crack has a length below 450 μm.

Preferably, the second metal sheet is a steel sheet or an aluminum sheet. More preferably, the second metal sheet is a steel sheet according to the present invention.

In another embodiment, the spot welded joint comprises a third metal sheet being a steel sheet or an aluminum sheet. For example, the third metal sheet is a steel sheet according to the present invention. FIG. 1 thus shows schematically a spot weld 40 for joining three coated metal sheets each with a steel sheet 10, 20, 30, first coating 12, 22, 32 and second coating 14, 24, 34, respectively.

The steel sheet or the spot welded joint according to the present invention can be used for the manufacture of parts for automotive vehicle.

The invention will now be explained in trials carried out for information only. They are not limiting.

EXAMPLES

Example 1: Optimization of Ni Coating Thickness with Respect to LME Resistance Behavior For all samples, steel sheets used have the following composition in weight percent: C=0.37%, Mn=1.9%, Si=1.9%, Cr=0.35%, Al=0.05% and Mo=0.1%.

In Trial 1, steel was annealed in an atmosphere comprising 5% of $H_2$ and 95% of $N_2$ at a dew point of −45° C. The annealing was carried out at 900° C. for 132 seconds. After that steel was quenched at 210° C. followed by partitioned at 410° C. for 88 seconds. Finally, the steel sheet was cooled to room temperature. On the annealed steel sheet, a Zinc coating was applied by an electro-galvanizing method.

In Trials 2 to 6, Ni was first deposited by an electro-plating method to have a thickness of 150, 400, 650, 900 nm and 1600 nm respectively on full hard steel sheets before annealing. After that, the pre-coated steel sheets were annealed in an atmosphere comprising 5% of $H_2$ and 95% of $N_2$ at a dew point of −45° C. The annealing was carried out at 900° C. for 132 seconds. At the end of the annealing, the steel sheets were cooled to a quench temperature of 210° C. and again heated at a partitioning temperature of 410° C. Partitioning was carried out for 88 s and then again heated up to a galvanizing temperature of 460° C. and a Zinc coating was applied by hot dip coating method using a liquid Zinc bath containing 0.20 wt. % Al maintained at 460° C. The objective of above trials was to determine the optimum Ni coating thickness which provides excellent LME resistance behavior. The susceptibility of LME of above coated steel was evaluated by resistance spot welding method. To this end, for each Trial, three coated steel sheets were welded together by resistance spot welding. The type of the electrode was ISO Type B with a face diameter of 6 mm; the force of the electrode was of 5 kN and the flow rate of water of was 1.5 g/min. the welding cycle was reported in Table 1:

TABLE 1

Welding schedule to determine optimum Ni coating thickness

| Weld time | Pulses | Pulse (cy) | Cool time (cy) | Hold time (cy) |
|---|---|---|---|---|
| Cycle | 2 | 12 | 2 | 15 |

The LME crack resistance behavior was evaluated using 3 layer stack-up conditions. The number of cracks having crack length of more than 100 μm was then evaluated using an optical microscope as reported in Table 2.

TABLE 2

LME crack details after spot welding (3 layer stack-up conditions) for Trials 1 to 6.

| Trials | Dew Point (° C.) | $1^{st}$ coating | $2^{nd}$ coating | Number of cracks per spot weld (>100 μm) | Maximum crack length (μm) |
|---|---|---|---|---|---|
| Trial 1 | −45° C. | — | Zn (EG) | 7 | 850 |
| Trial 2 | −45° C. | Ni (150 nm) | Zn (GI) | 3 | 620 |
| Trial 3 | −45° C. | Ni (400 nm) | Zn (GI) | 2 | 500 |
| Trial 4* | −45° C. | Ni (650 nm) | Zn (GI) | 2 | 420 |
| Trial 5* | −45° C. | Ni (900 nm) | Zn (GI) | 1 | 420 |
| Trial 6 | −45° C. | Ni (1600 nm) | Zn (GI) | 1 | 680 |

*according to the present invention.

Trials 4 and 5 according to the present invention show an excellent resistance to LME as compared to Trials 1, 2, 3 and 6. Indeed, the number of cracks above 100 μm is below or equal to 2 and the longest crack has a length below 450 μm. It results in a reduction of the amount of heat input during spot welding and thus causes a significant reduction of number of cracks formation due to LME.

The LME crack resistance behavior was also evaluated using 2 layer stack-up conditions for Trials 1, 4 and 5. In this condition, two coated steel sheets were welded together by resistance spot welding. The number of cracks above 100 μm was then evaluated using an optical microscope as reported in Table 3.

TABLE 3

LME crack details after spot welding (2 layer stack-up conditions) for Trials 1, 4 and 5.

| Trials | Number of cracks per spot weld (>100 μm) | Maximum crack length (μm) |
|---|---|---|
| Trial 1 | 3 | 750 |
| Trial 4* | 1 | 170 |
| Trial 5* | 1 | 300 |

*according to the present invention.

Trials 4 and 5 according to the present invention show an excellent resistance to LME as compared to Trial 1. Indeed, the number of cracks above 100 μm is of 1 and the longest crack has a length of 300 μm. It results in a reduction of the amount of heat input during spot welding and thus causes a significant reduction of number of cracks formation due to LME.

From above trial, excellent LME resistance behavior was observed when Ni coating thickness was maintained between 600 to 1400 nm. In order to enhance the LME resistance further, sub-surface area of the steel sheet was modified by formation of decarburized layer. Example 2 represents the combined effect of decarburized layer along with Ni coating having a specific thickness.

Example 2: Effect of Decarburization of Steel Sub-Surface Along with Ni Coating on LME Resistance Behavior In order to prevent any decarburization, in Trial 7, steel was annealed in an atmosphere comprising 5% of $H_2$ and 95% of $N_2$ at a dew point of −80° C. The annealing was carried out at 900° C. for 132 seconds. After that steel was quenched at 210° C. followed by partitioned at 410° C. for 88 seconds. Finally, the steel sheet was cooled to room temperature. On the annealed steel sheet, a Zinc coating was applied by the electro-galvanizing method.

In Trials 8 and 9, Ni was first deposited by the electroplating method to have a thickness of 900 nm on full hard steel sheets before annealing. After that, the pre-coated steel sheets were annealed in an atmosphere comprising 5% of $H_2$ and 95% of $N_2$ at a dew point of −80° C., for trial 8, without any decarburized layer in the sub-surface area of the steel. For trial 9, the annealing dew point was maintained at −10° C. with 5% of $H_2$ and 95% of $N_2$. For trial 8 and 9, the annealing was carried out at 900° C. for 132 seconds. At the end of the annealing, the steel sheets were cooled to quench temperature of 210° C. and again heated at partitioning temperature of 410° C. Partitioning was carried out for 88 s. Finally, the steel sheet was cooled to room temperature. On the annealed steel sheet, the Zinc coating was applied by the electro-galvanizing method.

Table 4 compares the decarburized layer thickness when the steel was annealed at different dew point without and with Ni coating. Without compromising steel mechanical properties, the decarburized layer thickness was restricted by controlling annealing dew point.

TABLE 4

Decarburized layer thickness of the sub-surface area of the steel sheet after annealing at different dew point

| Trials | DP (° C.) | $1^{st}$ coating | $2^{nd}$ coating | Decarburized layer (μm) |
|---|---|---|---|---|
| Trial 7 | −80 | — | Zn (EG) | 0 |
| Trial 8* | −80 | Ni (900 nm) | Zn (EG) | 0 |
| Trial 9* | −10 | Ni (900 nm) | Zn (EG) | 15 |

*according to the present invention.

The LME susceptibility of above coated steels (Trials 7, 8 and 9) was evaluated by resistance spot welding method. For this purpose, for each Trial, three coated steel sheets were welded together by resistance spot welding. The type of the electrode was ISO Type B with a face diameter of 6 mm; the force of the electrode was of 5 kN and the flow rate of water of was 1.5 g/min. The welding cycle was reported in Table 5:

TABLE 5

Welding schedule, to determine combined effect of Ni coating and decarburized layer

| Weld time | Pulses | Pulse (cy) | Cool time (cy) | Hold time (cy) |
|---|---|---|---|---|
| Cycle | 1 | 23 | NA | 18 |

The LME crack resistance behavior was evaluated using 2 layer stack-up conditions for Trials 7, 8 and 9. In this condition, two coated steel sheets were welded together by resistance spot welding. The number of cracks above 100 μm was then evaluated using an optical microscope as reported in Table 6.

TABLE 6

LME crack details after spot welding (2 layer stack-up conditions) for Trials 7, 8 and 9

| Trials | Number of cracks per spot weld (>100 μm) | average of sum of total crack size length above 100 μm per spot-weld (μm) |
|---|---|---|
| Trial 7 | 3 | 573 |
| Trial 8* | 1 | 122 |
| Trial 9* | 0 | 0 |

*according to the present invention.

Trials 8 and 9 according to the present invention show a high resistance to LME as compared to Trial 7. Moreover, For Trial 9, excellent LME resistance behavior was observed in steel sheet due to combined effect of decarburized layer with Ni layer having a specific thickness.

What is claimed is:

1. A method for the manufacture of a coated steel sheet, the method comprising the following successive steps:
    coating of a steel sheet with a first coating consisting of nickel and having a thickness between 600 nm and 950 nm, the steel sheet having the following composition in weight:

0.10<C<0.40%, 1.5<Mn<3.0%, 0.7<Si<3.0%, 0.05≤Al<1.0%, 0.75<(Si+Al)<3.0%, and on a purely optional basis, one or more elements including:

Nb≤0.5%,

B≤0.010%,

Cr≤1.0%,

Mo≤0.50%,

Ni≤1.0%,

Ti≤0.5%, a remainder of the composition making up of iron and inevitable impurities resulting from processing;
    recrystallization annealing of the coated steel sheet at a temperature between 820 to 1200° C., performed in an atmosphere comprising from 1 to 10% of $H_2$ at a dew point between −30 and +30° C.; and
    coating the steel sheet obtained in recrystallization annealing with a second coating based on zinc not comprising nickel.

2. The method as recited in claim 1 wherein the first coating has a thickness between 600 and 750 nm.

3. The method as recited in claim 1 wherein the recrystallization annealing is a continuous annealing.

4. The method as recited in claim 1 wherein in the recrystallization annealing is performed in an atmosphere comprising from 1 to 10% of $H_2$ at a dew point between −10 and +10° C.

5. The method as recited in claim 1 wherein the second coating includes above 50% of zinc.

6. The method as recited in claim 5 wherein the second coating includes above 75% of zinc.

7. The method as recited in claim 6 wherein the second coating includes above 90% of zinc.

8. The method as recited in claim 7 wherein the second coating consists of zinc.

9. The method as recited in claim 1 wherein the first coating has a thickness between 750 and 950 nm.

10. The method as recited in claim 1 wherein the first coating has a thickness between 650 and 900 nm.

* * * * *